United States Patent
Cronin et al.

(10) Patent No.: US 10,083,672 B1
(45) Date of Patent: Sep. 25, 2018

(54) AUTOMATIC CUSTOMIZATION OF E-BOOKS BASED ON READER SPECIFICATIONS

(71) Applicant: Rich Media Ventures, LLC, Miami, FL (US)

(72) Inventors: John Cronin, Bonita Springs, FL (US); Neil Balthaser, Montreal (CA)

(73) Assignee: Rich Media Ventures, LLC, Miami, FL (US)

( * ) Notice: Subject to any disclaimer, the term of this patent is extended or adjusted under 35 U.S.C. 154(b) by 0 days.

(21) Appl. No.: 15/142,401

(22) Filed: Apr. 29, 2016

(51) Int. Cl.
| | | |
|---|---|---|
| *G06F 17/24* | (2006.01) | |
| *G09G 5/00* | (2006.01) | |
| *G06F 17/21* | (2006.01) | |

(52) U.S. Cl.
CPC .......... *G09G 5/005* (2013.01); *G06F 17/212* (2013.01); *G06F 17/24* (2013.01); *G09G 2370/022* (2013.01); *G09G 2380/14* (2013.01)

(58) Field of Classification Search
CPC .... G06F 17/211; G06F 17/27; G06F 17/2247; G06F 17/30058; G06F 17/30899; G06F 17/30905; G06F 5/005; G06F 17/212; G06F 17/24; G06F 2380/14; G06F 2370/022
See application file for complete search history.

(56) References Cited

U.S. PATENT DOCUMENTS

| | | | |
|---|---|---|---|
| 6,011,537 A * | 1/2000 | Slotznick | G06F 3/14 707/E17.119 |
| 6,189,097 B1 | 2/2001 | Tycksen et al. | |
| 6,341,174 B1 * | 1/2002 | Callahan | G06T 15/205 382/154 |
| 6,480,861 B1 | 11/2002 | Kanevsky et al. | |
| 6,611,358 B1 * | 8/2003 | Narayanaswamy | H04N 1/33307 358/442 |
| 6,704,024 B2 * | 3/2004 | Robotham | G06F 3/14 345/581 |
| 7,213,062 B1 | 5/2007 | Raciborski et al. | |
| 7,263,685 B2 | 8/2007 | Eldar | |
| 7,298,851 B1 | 11/2007 | Hendricks et al. | |

(Continued)

OTHER PUBLICATIONS

White, Ron; "How Computers Work", 2003 7th Edition, p. 4.
(Continued)

*Primary Examiner* — Wilson W Tsui
(74) *Attorney, Agent, or Firm* — Polsinelli LLP

(57) ABSTRACT

A reader device for reading e-books may connect directly or indirectly to a cloud e-book service. The reader device may request access to a purchased otherwise obtained e-book through the cloud e-book service. The cloud e-book service retrieves a specification dataset that describes various characteristics of the reader device, such as display type and included hardware, and identifies any problematic media types that the reader device cannot properly display. The cloud e-book service then obtains an original copy of the requested e-book and or converts it into a modified e-book dataset by replacing at least one problematic media element of the problematic media type with a replacement media element that is properly displayable by the reader device. The cloud e-book service then transmits the modified e-book dataset to the reader device. The conversion may, for example, replace a video with a still frame from the video.

16 Claims, 7 Drawing Sheets

(56) References Cited

U.S. PATENT DOCUMENTS

| | | | |
|---|---|---|---|
| 7,552,068 B1 | 6/2009 | Brinkerhoff | |
| 7,620,555 B1 | 11/2009 | Plotlkin | |
| 7,711,513 B2 | 5/2010 | Sotirou | |
| 7,941,399 B2 | 5/2011 | Bailor et al. | |
| 8,005,825 B1* | 8/2011 | Ghosh | G06F 17/30675 707/723 |
| 8,312,079 B2* | 11/2012 | Newsome | G06F 17/30905 709/203 |
| 8,346,585 B1 | 1/2013 | Griffith et al. | |
| 8,392,538 B1 | 3/2013 | Lee | |
| 8,423,889 B1* | 4/2013 | Zagorie | G06F 17/30905 715/255 |
| 8,487,775 B2 | 7/2013 | Victor et al. | |
| 8,666,961 B1 | 3/2014 | Qureshi et al. | |
| 8,700,699 B2* | 4/2014 | Shen | H04L 67/02 709/203 |
| 8,725,565 B1 | 5/2014 | Ryan | |
| 8,755,058 B1 | 6/2014 | Jackson | |
| 8,826,036 B1 | 9/2014 | Snodgrass et al. | |
| 8,885,882 B1 | 11/2014 | Yin et al. | |
| 8,922,569 B1* | 12/2014 | Tidd | G06T 1/00 345/505 |
| 9,069,934 B1 | 6/2015 | Meeboer | |
| 9,087,056 B2 | 7/2015 | Cohen | |
| 9,116,991 B2 | 8/2015 | Vemula et al. | |
| 9,317,186 B2 | 4/2016 | MacLean et al. | |
| 9,331,856 B1 | 5/2016 | Song | |
| 9,348,935 B2 | 5/2016 | Doig et al. | |
| 9,378,299 B1* | 6/2016 | Rashidi | G06F 17/30899 |
| 9,575,615 B1 | 2/2017 | Nicholls et al. | |
| 9,864,737 B1 | 1/2018 | Cronin | |
| 9,886,172 B1 | 2/2018 | Cronin | |
| 10,015,244 B1 | 7/2018 | Cronin | |
| 2002/0006788 A1* | 1/2002 | Knutsson | H04W 4/02 455/422.1 |
| 2003/0172052 A1 | 9/2003 | Crandell et al. | |
| 2003/0177200 A1 | 9/2003 | Laughlin et al. | |
| 2004/0107348 A1 | 6/2004 | Iwamura | |
| 2005/0039034 A1 | 2/2005 | Doyle et al. | |
| 2005/0071758 A1* | 3/2005 | Ehrich | G06F 9/4443 715/234 |
| 2005/0081041 A1 | 4/2005 | Hwang | |
| 2005/0177805 A1 | 8/2005 | Lynch et al. | |
| 2005/0193335 A1 | 9/2005 | Dorai et al. | |
| 2006/0218476 A1 | 9/2006 | Gombert | |
| 2007/0168237 A1 | 7/2007 | Campbell | |
| 2007/0239704 A1 | 10/2007 | Burns et al. | |
| 2008/0013915 A1 | 1/2008 | Gill et al. | |
| 2008/0139191 A1* | 6/2008 | Melnyk | G06F 17/30905 455/419 |
| 2008/0232598 A1 | 9/2008 | Vennelakanti et al. | |
| 2008/0243662 A1 | 10/2008 | Subramaniam | |
| 2009/0019356 A1 | 1/2009 | Deyab et al. | |
| 2009/0254802 A1 | 10/2009 | Campagna et al. | |
| 2010/0003333 A1 | 1/2010 | Victor et al. | |
| 2010/0086278 A1 | 4/2010 | Stankiewicz et al. | |
| 2010/0205029 A1 | 8/2010 | Asherman et al. | |
| 2011/0055191 A1 | 3/2011 | Bain | |
| 2011/0213655 A1 | 9/2011 | Henkin et al. | |
| 2011/0289108 A1* | 11/2011 | Bhandari | G06F 17/30905 707/769 |
| 2012/0047455 A1 | 2/2012 | Yuan et al. | |
| 2012/0105486 A1 | 5/2012 | Lankford et al. | |
| 2012/0150680 A1 | 6/2012 | Golus et al. | |
| 2012/0150993 A1* | 6/2012 | Flack | H04W 4/18 709/217 |
| 2012/0192254 A1 | 7/2012 | Garcia Perez et al. | |
| 2012/0200573 A1 | 8/2012 | Stoner et al. | |
| 2012/0240039 A1 | 9/2012 | Walker et al. | |
| 2012/0246557 A1* | 9/2012 | Venugopal | H04L 67/2823 715/234 |
| 2012/0323842 A1 | 12/2012 | Izhikevich et al. | |
| 2012/0325901 A1 | 12/2012 | Ross | |
| 2013/0007036 A1 | 1/2013 | Childs et al. | |
| 2013/0054622 A1 | 2/2013 | Karmarkar et al. | |
| 2013/0066746 A1 | 3/2013 | O'Hara et al. | |
| 2013/0073998 A1 | 3/2013 | Migos et al. | |
| 2013/0132230 A1 | 5/2013 | Gibson et al. | |
| 2013/0132820 A1 | 5/2013 | Poindessault | |
| 2013/0166340 A1 | 6/2013 | Salame | |
| 2013/0191708 A1 | 7/2013 | Song | |
| 2013/0205232 A1 | 8/2013 | Vandermolen et al. | |
| 2013/0283147 A1 | 10/2013 | Wong et al. | |
| 2014/0006308 A1 | 1/2014 | Baggott et al. | |
| 2014/0019562 A1 | 1/2014 | Le Chevalier et al. | |
| 2014/0019766 A1 | 1/2014 | Takahashi et al. | |
| 2014/0074648 A1 | 3/2014 | Morton et al. | |
| 2014/0115449 A1 | 4/2014 | Migos et al. | |
| 2014/0115508 A1 | 4/2014 | MacLean et al. | |
| 2014/0172505 A1 | 6/2014 | Dekhtyaruk | |
| 2014/0201180 A1 | 7/2014 | Fatourechi et al. | |
| 2014/0210855 A1 | 7/2014 | Cohen | |
| 2014/0229810 A1 | 8/2014 | Ramanathan et al. | |
| 2014/0253694 A1 | 9/2014 | Zustak et al. | |
| 2015/0019874 A1 | 1/2015 | Kim et al. | |
| 2015/0046827 A1 | 2/2015 | Akselrod et al. | |
| 2015/0082156 A1 | 3/2015 | Rollins et al. | |
| 2015/0154660 A1 | 6/2015 | Weald et al. | |
| 2015/0286489 A1* | 10/2015 | Brown, Jr. | G06Q 30/0621 717/178 |
| 2015/0356060 A1 | 12/2015 | Peden | |
| 2015/0370331 A1 | 12/2015 | Gonzales | |
| 2016/0110789 A1 | 4/2016 | Gilb | |
| 2017/0243277 A1 | 8/2017 | You et al. | |

OTHER PUBLICATIONS

U.S. Appl. No. 15/142,831 Office Action dated Sep. 22, 2016.
U.S. Appl. No. 15/142,410 Office Action dated Sep. 8, 2016.
U.S. Appl. No. 15/142,419 Office Action dated Aug. 25, 2016.
U.S. Appl. No. 15/142,819 Office Action dated Dec. 1, 2016.
U.S. Appl. No. 15/142,095 Office Action dated Nov. 14, 2016.
U.S. Appl. No. 15/143,192 Office Action dated Nov. 21, 2016.
U.S. Appl. No. 15/142,410 Final Office Action dated Jan. 27, 2017.
U.S. Appl. No. 15/142,419 Final Office Action dated Feb. 10, 2017.
U.S. Appl. No. 15/142,819 Final Office Action dated Jun. 2, 2017.
U.S. Appl. No. 15/142,410 Office Action dated May 18, 2017.
U.S. Appl. No. 15/142,095 Final Office Action dated May 17, 2017.
U.S. Appl. No. 15/142,419 Office Action dated Jun. 5, 2017.
U.S. Appl. No. 15/143,192 Final Office Action dated May 30, 2017.
U.S. Appl. No. 15/142,831 Final Office Action dated Apr. 7, 2017.
U.S. Appl. No. 15/142,819 Office Action dated Sep. 20, 2017.
U.S. Appl. No. 15/143,192 Office Action dated Jan. 11, 2018.
U.S. Appl. No. 15/142,819 Final Office Action dated Apr. 27, 2018.
U.S. Appl. No. 15/142,831 Office Action dated Jul. 19, 2018.
U.S. Appl. No. 15/143,192 Final Office Action dated Jul. 20, 2018.

\* cited by examiner

AUTOMATIC CUSTOMIZATION OF E-BOOKS BASED ON READER SPECIFICATIONS

BACKGROUND OF THE INVENTION

1. Field of Invention

The present invention generally relates to electronic books and electronic book reader devices. More specifically, the present invention relates to customization of electronic book data for optimal reading on a particular electronic book reader device.

2. Description of the Related Art

Electronic books, or "e-books," are generally electronic data files that include data that can be interpreted by an electronic book reader/viewer device, or an "e-book reader device," and arranged by the electronic book reader device into a format similar to that of a traditional paper-based book. Existing e-book formats include AZW, MOBI, PDF, or EPUB files.

Different e-book reader devices have different capabilities. For example, some e-book reader devices can only reproduce monochrome text. Other e-book reader devices can also reproduce monochrome black-and-white images. Other e-book reader devices can reproduce greyscale images. Other e-book reader devices can reproduce color images. Other e-book reader devices, such as full-fledged smartphones or tablet computer devices, can reproduce videos, interactive models, or other types of rich dynamic media not that are typically not found in e-books.

Rich media, as used in the present disclosure, refers to content that may include not only text (i.e., words) or images (i.e., pictures) to convey information to the user, but may also include or utilize a variety of advanced features such as video and audio that encourages viewers to interact and engage with the content being viewed. Rich media may also be referred to as known as dynamic media, and may further includes interactive or moveable multimedia, such as videos, interactive three-dimensional images, maps, or games.

Some devices, such as laptop computers, smartphones, or tablet computing devices, may be capable of displaying rich media and interpreting any necessary user inputs (e.g., pressing a "play" button of a video player, requesting that a three-dimensional image be rotated, zooming or moving a map). Other devices, such as traditional "electronic ink" e-book reader devices intended only for displaying text, are typically unable to display rich media. As a result, rich media is typically not included in e-books.

Thus, there is a need for an improved e-book platform that provides e-books with embedded rich media to reader devices that can display rich media, and converts such e-books to a less-intensive format to provide to reader devices that cannot display rich media.

SUMMARY OF THE PRESENTLY CLAIMED INVENTION

A first claimed embodiment of the present invention concerns a method for electronic book data customization that includes receiving an electronic book request that requests modified electronic book data associated with a first electronic book. The method also includes receiving a specification dataset that identifies a characteristic of a reader device that prevents the reader device from properly displaying a problematic media type. The method also includes retrieving an original electronic book dataset corresponding to the first electronic book. The method also includes converting the original electronic book dataset into a modified electronic book dataset by replacing at least one problematic media element of the problematic media type with a replacement media element that is properly displayable by the reader device. The method also includes transmitting at least a subset of the modified electronic book dataset to the reader device.

A second presently claimed embodiment of the present invention involves a system for electronic book data customization that includes a communication transciever that receives an electronic book request and a specification dataset. The electronic book request requests modified electronic book data associated with a first electronic book. The specification dataset identifies a characteristic of a reader device that prevents the electronic book reader from properly displaying a problematic media type. The system also includes a memory as well as a processor coupled to the memory and to the communication transciever. Execution of instructions stored in the memory by the processor performs system operations. The system operations include retrieving an original electronic book dataset corresponding to the first electronic book. The system operations also include converting the original electronic book dataset into a modified electronic book dataset by replacing at least one problematic media element of the problematic media type with a replacement media element that is properly displayable by the reader device. The system operations also include triggering transmission at least a subset of the modified electronic book dataset to the reader device via the communication transciever.

A third claimed embodiment of the present invention concerns a non-transitory computer-readable storage medium, the non-transitory computer-readable storage medium having embodied thereon a program executable by a processor to perform an exemplary program method for electronic book data customization that includes receiving an electronic book request that requests modified electronic book data associated with a first electronic book. The method also includes receiving a specification dataset that identifies a characteristic of a reader device that prevents the reader device from properly displaying a problematic media type. The method also includes retrieving an original electronic book dataset corresponding to the first electronic book. The method also includes converting the original electronic book dataset into a modified electronic book dataset by replacing at least one problematic media element of the problematic media type with a replacement media element that is properly displayable by the reader device. The method also includes transmitting at least a subset of the modified electronic book dataset to the reader device.

DETAILED DESCRIPTION

A reader device for reading e-books may connect directly or indirectly to a cloud e-book service. The reader device may request access to a purchased otherwise obtained e-book through the cloud e-book service. The cloud e-book service retrieves a specification dataset that describes various characteristics of the reader device, such as display type and included hardware, and identifies any problematic media types that the reader device cannot properly display. The cloud e-book service then obtains an original copy of the requested e-book and or converts it into a modified e-book dataset by replacing at least one problematic media element of the problematic media type with a replacement media element that is properly displayable by the reader device. The cloud e-book service then transmits the modified e-book dataset to the reader device. The conversion may, for example, replace a video with a still frame from the video.

Figure 1A:
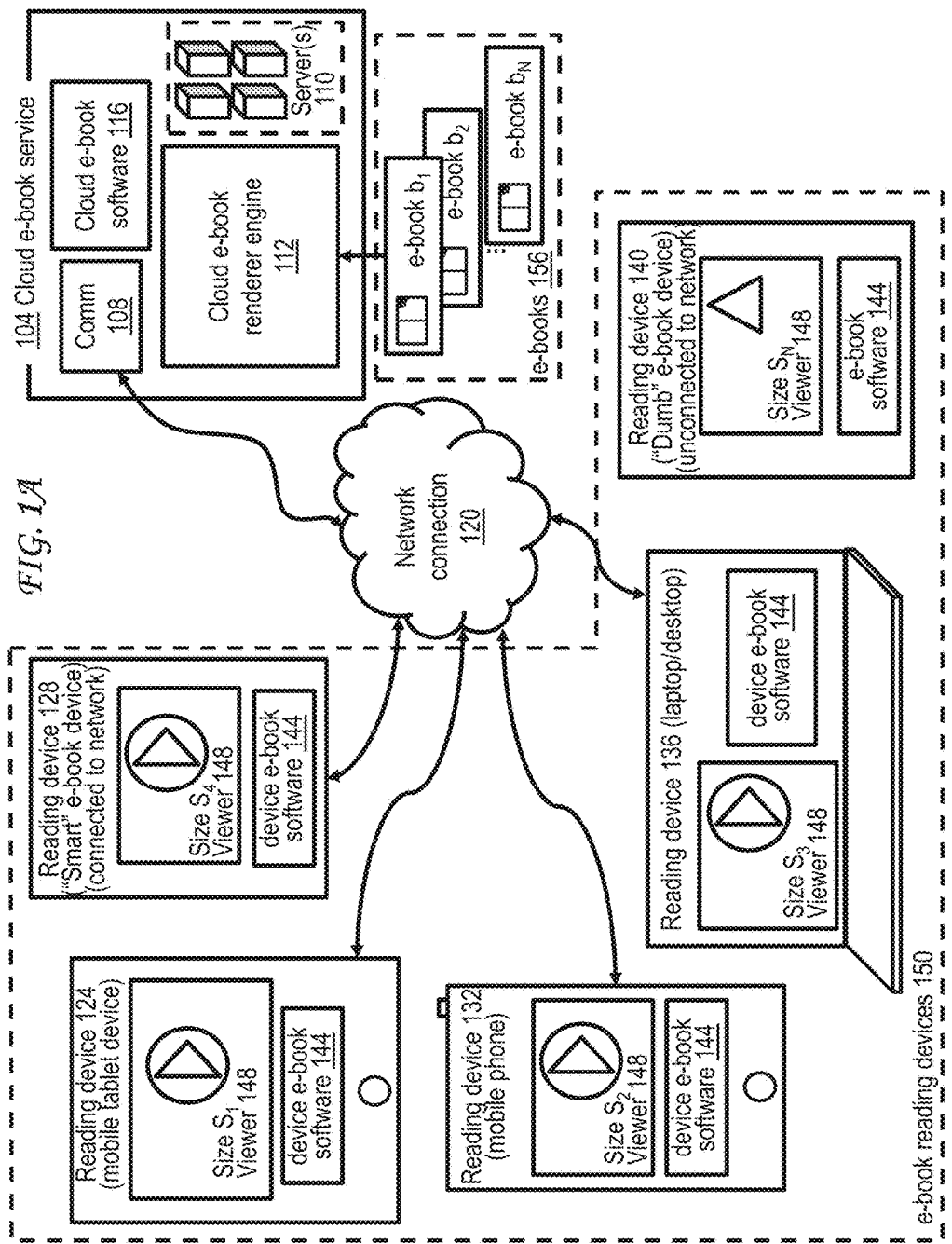
FIG. 1A illustrates an exemplary e-book ecosystem with a cloud e-book service and multiple e-book reader devices.

FIG. 1A illustrates an exemplary e-book ecosystem with a cloud e-book service and multiple e-book reader devices. The e-book ecosystem of FIG. 1A includes a cloud e-book service 104, which may be provided to one or more e-book reading/viewing devices 150 via one or more server(s) 110. The server(s) 110 may include website servers that provide data via Internet websites, intranet network portals, or software applications stored at the e-book reading devices 150 (e.g., via an application programming interface or "API") or some combination thereof.

The cloud e-book service 104 includes various hardware elements, which may be incorporated into one or more of the server(s) 110 or be separate. In particular, the cloud e-book service 104 may include one or more processors (e.g., processor 510 of FIG. 5), one or more memory/storage units (e.g. memory 520, mass storage 530, portable storage 540, or some combination thereof), and a communications module 108. The communications transceiver ("comm") 108 may connect to a network connection 120, which may be connected to one or more of the e-book reading device devices 150.

The network connection 120 may be a connection to the Internet. The network connection 120 may also be a connection to a private "intranet" network, such as a local area network (LAN), wireless local area network (WLAN), municipal area network (MAN), or wide area network (WAN).

The communications transceiver 108 may be used to send and receive data through wired means, wireless means, or some combination thereof. The communications transceiver 108 may include one or more data transmission cables (e.g., Ethernet, fiber optic, modem, Universal Serial Bus or "USB," lightning, thunderbolt, audio jack cable, 30-pin cable, HDMI cable, VGA cable) or ports for such cables. The communications transceiver 108 may include one or more short-range or long-range wireless receivers and/or transmitters. For example, the communications transceiver 108 may include a Wi-Fi connection module, a 3G/4G/LTE cellular connection module, a Bluetooth™ connection module, a Bluetooth™ low energy connection module, Bluetooth™ Smart connection module, a near field communication (NFC) module, a radio wave communications module, a microwave communications module, a magnetic induction module, a magnetic resonance module, an electromagnetic radiation transceiver module, a visible light communication (VLC) transmission lamp/laser/module, a speaker (e.g., audible sound transmitter, ultrasonic transmitter, infrasonic transmitter, with or without noise cancelling features), a microphone (e.g., detecting audible, ultrasonic, infrasonic sound), a light sensor (e.g., detecting visible light, infrared light, ultraviolet light, and other ranges of the electromagnetic spectrum), or some combination thereof.

The cloud e-book service 104 may include a variety of software elements as well, which may be stored in a memory or storage module of the cloud e-book service 104 (e.g., a memory of the servers 110) and executed by a processor of the cloud e-book service 104 (e.g., a processor of the servers 110). In particular, the cloud e-book service 104 may include a cloud e-book software 116, which may be used to provide e-book data and/or user interface data (e.g., associated with a website or e-book reader software application) to one or more of the e-book reading devices 150. The cloud e-book service 104 may also include a cloud e-book renderer engine 112, which may render, re-render, downsample, or convert rich media elements in certain e-books into variants of the rich media that are presentable on a specific e-book reading device. For example, an e-book file with an embedded color video on a given page may be converted by the cloud e-book renderer engine 112 with a greyscale frame-grab from the video on the same page, so that the e-book can still be experienced to the best possible degree on any of the e-book reading devices 150 no matter their capabilities.

Rich media, as used in the present disclosure, refers to content that may include not only text (i.e. words) or images (i.e. pictures) to convey information to the user, but may also include or utilize a variety of advanced features such as video and audio that encourages viewers to interact and engage with the content being viewed. The content discussed herein may include a variety of rich media, as well as traditional text or image content.

The cloud e-book service 104 may also include various data structures for storing and/or organizing data files, such as databases, tables, trees, hash tables, queues, arrays, lists, and arraylists. These are some of the data structures that may be used to store one or more e-books 156 at the cloud e-book service 104 (e.g., identified in FIG. 1A as e-books $b_1$, $b_2$, and so forth up to $b_N$).

The e-book ecosystem of FIG. 1A also includes various kinds of e-book reading devices 150. Each e-book reading device of the e-book reading devices 150 may be some variety of computer system 500 or may include at least a subset of the hardware components and software elements identified in FIG. 5. Each e-book reading device of the e-book reading devices 150 may, for example, include some kind of memory or data storage (e.g. memory 520, mass storage 530, portable storage 540, or some combination thereof), some kind of processor (e.g. processor 510), some kind of input mechanism(s) (e.g. input devices 560), and some kind of display system (e.g., display system 570).

Each e-book reading device of the e-book reading devices 150 may store in memory and execute via processor a device e-book software 144, which may be used to view/read content from one or more of the e-books 156, after conversion or re-rendering via the cloud e-book renderer engine 112 if applicable.

Some of the e-book reading devices 150 may have communications transceivers, which may include any combination of functions described in relation to the communications transceiver 108 of the cloud e-book service 104. E-book reading devices that include a communications transceiver may use the device e-book software 144 to receive at least a subset of the e-books 156 from the cloud e-book service 104 via the network connection 120 (e.g., the Internet or an intranet network). Some e-book reading devices may include a communications transceiver with limited functionality, such as a Bluetooth™ wireless connection or a USB wired connection that can connect to other devices but not to the network connection 120; such devices may receive at least a subset of the e-books 156 from the cloud e-book service 104 via a proxy device that can then access the network connection 120 and fetch the desired e-books for the device with limited functionality. For example, the "dumb" e-book reading device 140 may be such a device.

One exemplary e-book reading device of the e-book reading devices 150 is the reading device 124, which is a mobile tablet computing device with a communication transceiver that can connect to the network connection 120 (e.g. via a Wi-Fi connection) and an e-book viewer display 148 of size $S_1$, that may be capable of displaying at least a subset of rich media. The device e-book software 144 may be a software application ("app") executed by the mobile tablet computing device after being downloaded from a software application repository such as an "app store" or a website.

Another exemplary e-book reading device of the e-book reading devices 150 is the reading device 132, which is a mobile phone device (e.g., a "smartphone") with a communication transceiver that can connect to the network connection 120 (e.g. via a Wi-Fi connection or a 3G/4G/LTE connection) and an e-book viewer display 148 of size $S_2$, that may be capable of displaying at least a subset of rich media. The device e-book software 144 may be a software application ("app") executed by the mobile tablet computing device after being downloaded from a software application repository such as an "app store" or a website.

Another exemplary e-book reading device of the e-book reading devices 150 is the reading device 136, which is a laptop or desktop computer device with a communication transceiver that can connect to the network connection 120 (e.g. via Ethernet or a Wi-Fi connection) and an e-book viewer display 148 of size $S_3$, that may be capable of displaying at least a subset of rich media. The device e-book software 144 may be a software application ("app") executed by the mobile tablet computing device after being downloaded from a software application repository such as an "app store" or a website, or after being retrieved from a portable storage device 540 such as an optical disk or a USB storage drive.

Another exemplary e-book reading device of the e-book reading devices 150 is the reading device 128, which is a "smart" e-book reader device with a communication transceiver that can connect to the network connection 120 and an e-book viewer display 148 of size $S_4$ that typically cannot (but may in some circumstances) be capable of displaying rich media. The device e-book software 144 may be integrated into the operating system of the e-book reading device 128.

Another exemplary e-book reading device of the e-book reading devices 150 is the reading device 140, which is a "dumb" e-book reader device that either lacks a communication transceiver or has a communication transceiver that cannot connect to the network connection 120 without a proxy, and that has an e-book viewer display 148 of size $S_N$ that typically cannot (but may in some circumstances) be capable of displaying rich media. The device e-book software 144 may be integrated into the operating system of the e-book reading device 140.

Other exemplary e-book reading devices may include video game consoles, portable media players, home media centers, vehicle-based computers, or any other type of computer.

It should be noted that each of the above-described types of e-book reading devices may run device e-book software 144 that is an integrated part of an operating system, that is separate from the operating system, or some combination thereof. Operating system elements and separate applications alike may be downloaded from a software application repository such as an "app store" or a website, or may be retrieved from a portable storage device 540 such as an optical disk or a USB storage drive.

Figure 1B:
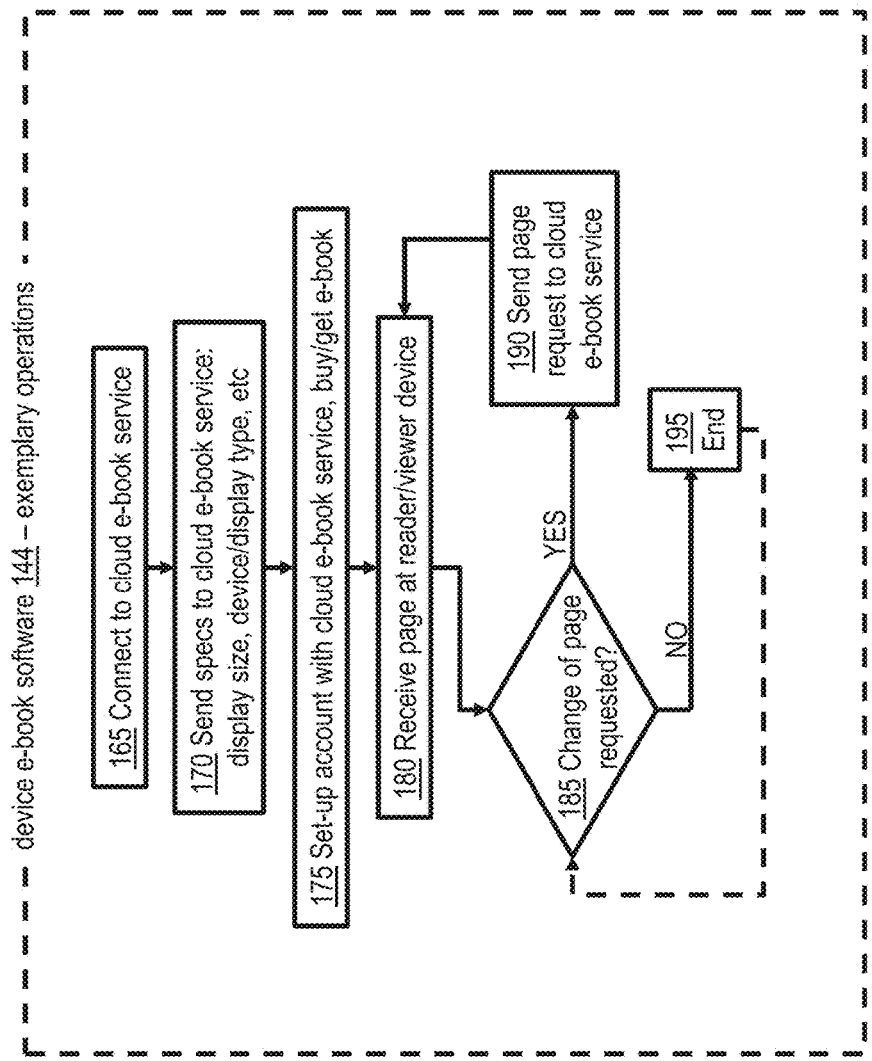
FIG. 1B is a flow chart illustrating exemplary operations of a device e-book software of an exemplary e-book reader device.

FIG. 1B is a flow chart illustrating exemplary operations of a device e-book software 144 of an exemplary e-book reader device.

At step 165, the device e-book software 144 connects the e-book reader device to the cloud e-book service 104 via the network connection 120, either directly through communication transceiver connected to the network connection 120 or indirectly via a connection to a proxy device that is connected to the network connection 120.

At step 170, the device e-book software 144 transmits a specification dataset to the cloud e-book service 104. The specification dataset describes details about the e-book reader device that may be relevant to displaying certain types of content, such as rich media content. For example, a specification dataset may identify display specifications, such as a display size, a display density, a display aspect ratio, a type of display (e.g., electronic ink, light emitting diode or "LED", liquid crystal display or "LCD", organic light emitting diode or "OLED", plasma), a display spectrum capability (e.g., monochrome, greyscale, limited color, or full color), or some combination thereof. The specification dataset may also identify device performance specifications, such as processor speed, number of processor cores, memory amount, unused memory amount, storage amount, unused storage amount, graphical processor unit (GPU) specifications, or some combination thereof. The specification dataset may also identify the presence or lack thereof of particular hardware components, such as control buttons, switches, mice, keyboards, trackballs, trackpads, multi-touch trackpads, variable-pressure-detection trackpads, touchscreens, multi-touch touchscreens, variable-pressure-detection touchscreens, or some combination thereof. The specification dataset may also identify a presence or lack thereof of particular software applications, plugins, or drivers. For example, the specification dataset may identify the presence or lack thereof of a Java interpreter, an ActiveX interpreter/compiler, a javascript interpreter, various other programming language compilers, various other programming language interpreters, virtual machine software, three-dimensional display software, image compression software, compressed image reproduction software, video codecs, audio codecs, hardware drivers, a browser plugin, a viewer for a particular format (e.g., EPUB, AZW, LIT, ODF, MOBI, PDF, JPG, PNG, TIFF, RAW, GIF, MOV, M4V, MP4, AVI, HTML), or some combination thereof. The specification dataset may also identify other details about an e-book reader device.

At step 175, the device e-book software 144 may allow creation of a user account associated with the e-book reader device and/or a user of the e-book reader device at the cloud e-book service 104. The user account may include personal profile information about the user, such as a name, username, address, phone number, email address, photograph, or some combination thereof. The user account may also include payment/billing information, such as credit card information, debit card information, bank account information, electronic payment account information, or check information. The cloud e-book service 104 may then store the user account in a data structure, such as a database, stored in a memory or data storage device of the cloud e-book service 104. The user account may be stored at the cloud e-book service 104 along with the specification dataset.

At step 175, the device e-book software 144 also allows for the purchase or free retrieval of an e-book via the user account. Any transactions associated with such a purchase may use payment information associated with the user account. Any books purchased or retrieved may, in some cases, be used with any e-book reading devices associated with the user account, or with a predetermined maximum number of e-book reading devices associated with the user account.

At step 180, the device e-book software 144 receives a particular page or portion of the e-book to be displayed at a display 148 of the e-book reading device, either from a locally stored copy in a memory or data storage component of the e-book reading device, or "streamed" part-by-part from the cloud e-book service 104, or some combination thereof (e.g., an e-book may be "streamed" part-by-part but certain parts may be cached locally at the e-book reading device).

At step 185, the device e-book software 144 determines whether a page change has been requested. This may include movement to a different page or portion of the e-book (e.g., flipping to a next/previous page or portion, skipping to a different chapter/section) or another interaction that changes what content, or how much content, is displayed (e.g., shrinking the font size may bring in more content that was not previously displayed). If no page change is requested, the device e-book software 144 does nothing at step 195 until optionally eventually checking again if a page change is requested at step 185. If a page change is requested at step 185, then at step 190, the device e-book software 144 requests the next page or portion of the book that was requested as a result of the page change, either from local memory or from the cloud e-book service 104.

Figure 2:
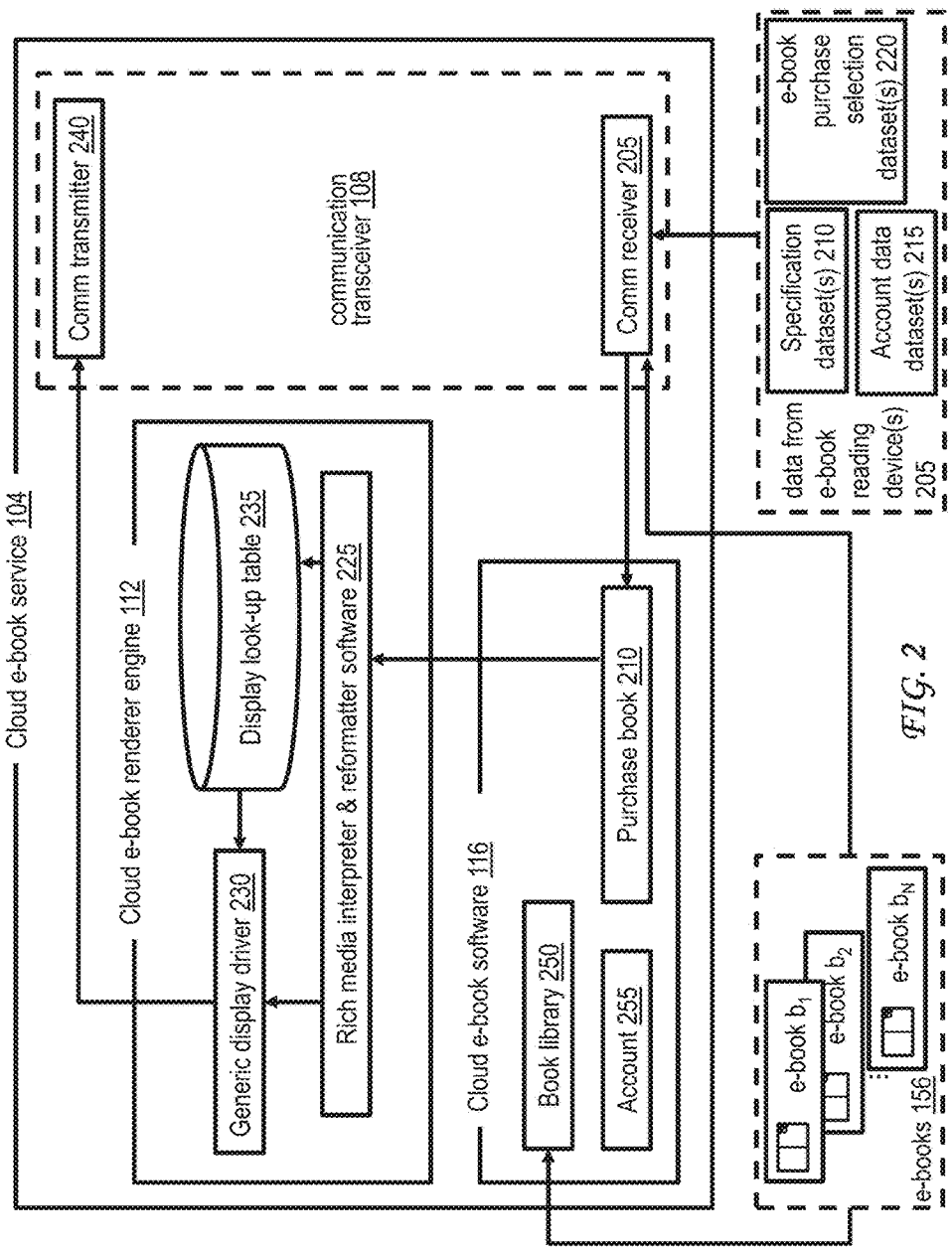
FIG. 2 illustrates exemplary elements of the cloud e-book service.

FIG. 2 illustrates exemplary elements of the cloud e-book service. In particular, the cloud e-book service 104 may include the communication transceiver 108 as described in relation to FIG. 1A. The communication transceiver 108 may include a communication receiver 205, which may receive e-book data 156 (e.g., from e-book publishers or retailers) and/or may receive data 205 from e-book reading devices 150, such as specification dataset(s) 210 (e.g. see step 170 of FIG. 1B), account data dataset(s) 215 (e.g., see step 175 of FIG. 1B), and book purchase selection dataset(s) 220 (e.g., see step 175 of FIG. 1B).

The cloud e-book software 116 of the cloud e-book service 104 includes an "account" module 255, which identifies and stored data about various user accounts (e.g., in a user account database, not shown) and allows an e-book reading device to create a new account (e.g. via an account data dataset 215 as described in step 175 of FIG. 1B). The "account" module 255 may also identify book libraries of individual users (i.e., which books that user account has purchased, received as a gift, or obtained for free).

The cloud e-book software 116 of the cloud e-book service 104 includes a "book library" module 250, which stored a number of e-books 156 at the cloud e-book service 104 for sale to e-book reading devices 150 and receives new e-books via the communication receiver 205. The "book library" module 250 may also identify which books have been purchased, received as a gift, or obtained for free by a particular user account.

The cloud e-book software 116 of the cloud e-book service 104 includes a "purchase book" module 210 that allows user accounts to receive a book purchase request from an e-book reading device (e.g., the desired book identified in book purchase selection dataset 220). The "purchase book" module 210, after identifying the purchase to the "account" module 255 and "book library" module 250, may identify the e-book (e.g., using the e-book purchase selection dataset 220) and the specifications of the e-book reading device (e.g., using the specification dataset 210) to the rich media interpreter & reformatter software 225 of the cloud e-book renderer engine 112 of the cloud e-book service 104.

The rich media interpreter & reformatter software 225 of the cloud e-book renderer engine 112 of the cloud e-book service 104 converts the data from the selected e-book into a format that can be read by the receiving e-book reading device (e.g., as defined by the specification dataset 210). The rich media interpreter & reformatter software 225 can, if necessary, look up certain information from the specification dataset 210 in a display look-up table 235 to obtain a display driver 230 if necessary. The rich media interpreter & reformatter software 225 performs any necessary conversions to allow the e-book data to be displayed in the best possible format. For example, if the e-book includes rich data such as a video, the media interpreter & reformatter software 225 may obtain a still frame image from the video and include a screenshot of the video if the e-book reading device cannot display videos. The still frame image may be resized and made to be in full-color, limited color, grayscale, monochrome, or may even be an "ASCII art" representation of an image using alphanumeric symbols via ASCII or Unicode as available at the recipient device. Similarly, a three-dimensional interactive model may be captured at one or more angles and turned into one or more flat images via the rich media interpreter & reformatter software 225. Images may also be omitted entirely. The rich media interpreter & reformatter software 225 may also convert formats as depicted in FIG. 3A.

Once the rich media interpreter & reformatter software 225 finishes converting and reformatting the e-book data as necessary, it is fed to the communication transmitter 240 of the communication transciever 108 (after optionally first running it through the display driver 230), after which it is sent to the e-book reading device described in the specification dataset 210 via the network connection 120 as shown in FIG. 1A.

Figure 3A:
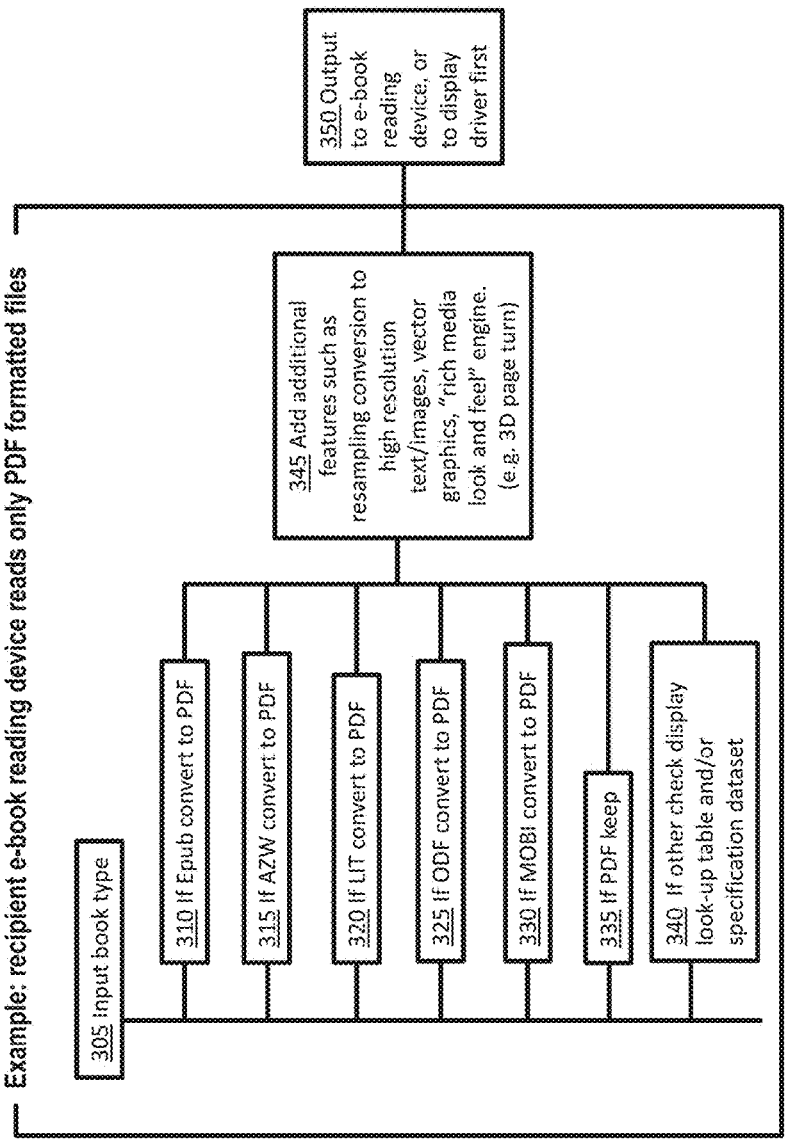
FIG. 3A is a flow chart illustrating exemplary operations of a rich media interpreter & reformatter software of an exemplary cloud e-book service.

FIG. 3A is a flow chart illustrating exemplary operations of a rich media interpreter & reformatter software 225 of an exemplary cloud e-book service. In the example of FIG. 3A, the recipient e-book reading device is only capable of reading e-book data in PDF format (e.g., because its specification dataset 210 indicates that it lacks software necessary to interpret other e-book formats).

At step 305, e-book data is loaded up by the rich media interpreter & reformatter software 225 in its original format (e.g., as obtained by the "book library" module 250).

At step 310, if the original format of the e-book data at step 305 is EPUB, the rich media interpreter & reformatter software 225 converts the e-book data into PDF format.

At step 315, if the original format of the e-book data at step 305 is AZW, the rich media interpreter & reformatter software 225 converts the e-book data into PDF format.

At step 320, if the original format of the e-book data at step 305 is LIT, the rich media interpreter & reformatter software 225 converts the e-book data into PDF format.

At step 325, if the original format of the e-book data at step 305 is ODF, the rich media interpreter & reformatter software 225 converts the e-book data into PDF format.

At step 330, if the original format of the e-book data at step 305 is MOBI, the rich media interpreter & reformatter software 225 converts the e-book data into PDF format.

At step 335, if the original format of the e-book data at step 305 is PDF, the rich media interpreter & reformatter software 225 does nothing to the e-book data, and keeps it in PDF format.

At step 340, if the original format of the e-book data at step 305 is something other than the formats identified above, the rich media interpreter & reformatter software 225 may check the specification dataset sent by the e-book reading device and/or the look-up table to determine if the e-book reading device can read it. If the rich media interpreter & reformatter software 225 decides that the e-book reading device can read the original format, it may keep the original format without reformatting. If the rich media interpreter & reformatter software 225 decides that the e-book reading device cannot read the original format, it may convert the e-book data into PDF format.

At step 345, the rich media interpreter & reformatter software 225 may add additional features to the processed e-book data. For example, the rich media interpreter & reformatter software 225 may resample text to a higher-resolution font format or vector-based fonts, and may locate higher-resolution copies of images where the recipient e-book reading device will be able to view them at those resolutions, and may add various "rich media look and feel" engine attributes such as a three-dimensional page-turning effect.

At step 350, the rich media interpreter & reformatter software 225 outputs the resulting converted/reformatted e-book data to an e-book reading device, or to a display driver software first.

Figure 3B:
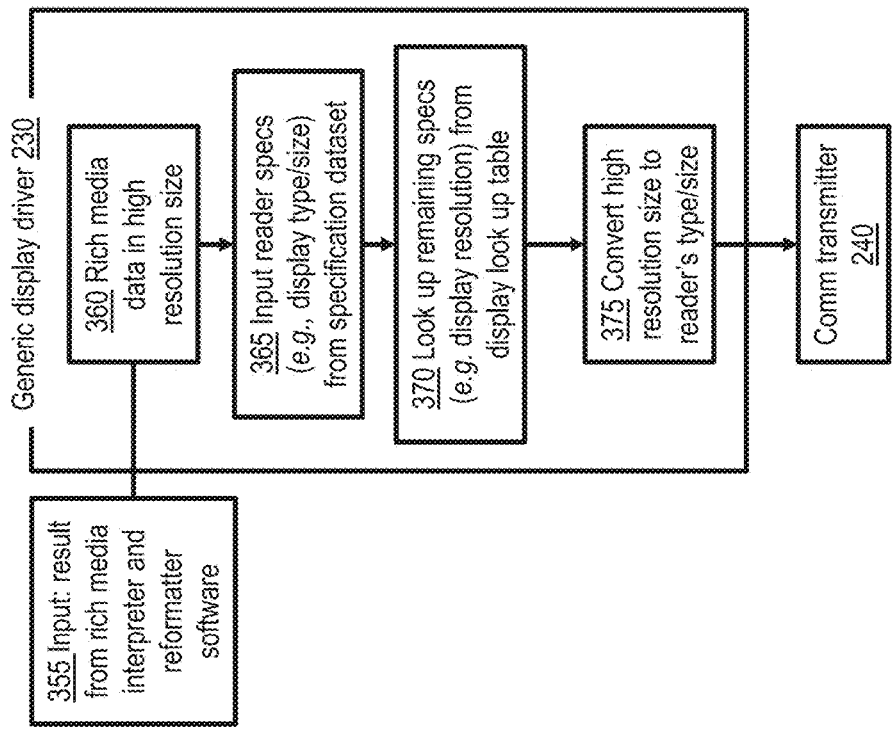
FIG. 3B is a flow chart illustrating exemplary operations of a generic display driver software of an exemplary cloud e-book service.

FIG. 3B is a flow chart illustrating exemplary operations of a generic display driver software 230 of an exemplary cloud e-book service.

At step 355, the generic display driver software 230 receives an input of e-book data that is the result of any conversion and/or reformatting performed by the rich media interpreter & reformatter software 225 (e.g., see step 350 of FIG. 3A). The input of step 355 may in some cases be original e-book data in the event that no conversion and/or reformatting was necessary or performed by the rich media interpreter & reformatter software 225.

At step 360, the generic display driver software 230 interprets this e-book data, which may include rich media data in high-resolution sizes (e.g., large PDF files in the case of the process illustrated in FIG. 3A).

At step 365, the generic display driver software 230 may obtain the specifications of the e-book reading device (e.g., display type and size) from the specifications dataset 210.

At step 370, the generic display driver software 230 may obtain any remaining specifications of the e-book reading device (e.g., display type and size) from the specifications dataset 210.

At step 375, the generic display driver software 230 may convert the high-resolution result of the rich media interpreter & reformatted software 225 to a more appropriate type and/or size.

At step 380, the generic display driver software 230 sends the resulting e-book data to the communication transmitter 240, which sends it to the e-book reading device that has requested it.

Figure 4:
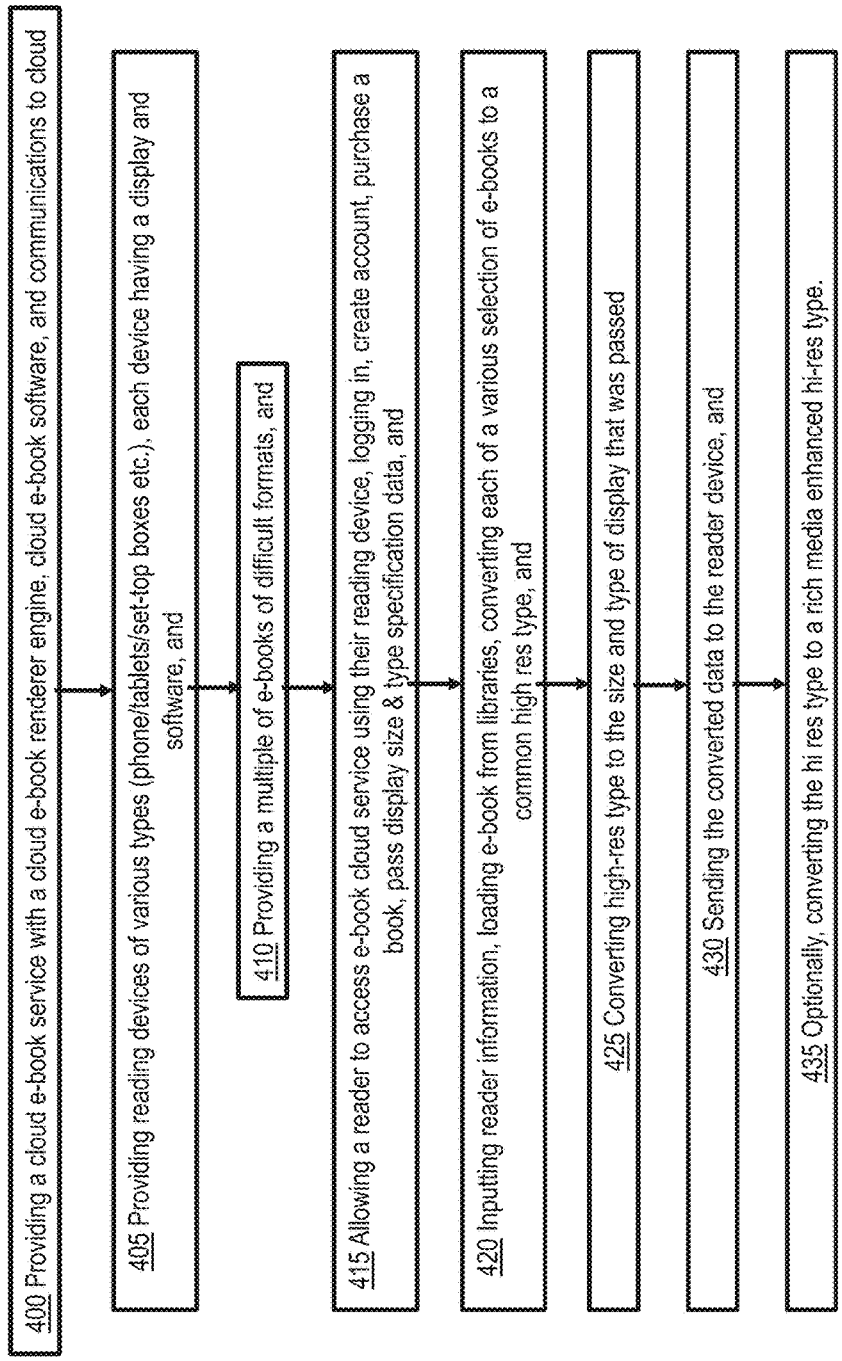
FIG. 4 illustrates an exemplary overall method of the present invention as described herein.

FIG. 4 illustrates an exemplary overall method of the present invention as described herein.

At step 400, the overall method provides a cloud e-book service 104 with a cloud e-book renderer engine, cloud e-book software, and communications to cloud.

At step 405, the overall method provides reading devices 150 of various types (phone/tablets/set-top boxes etc.), each device having a display 148 and software 114.

At step 410, the overall method provides a multiple of e-books of difficult formats.

At step 415, the overall method allows a reader to access e-book cloud service 104 using their reading device, logging in, create account, purchase a book, pass display size & type specification data.

At step 420, the overall method inputs reader information, loading e-book from libraries, converting each of a various selection of e-books to a common high res type.

At step 425, the overall method converts high-res type to the size and type of display that was passed.

At step 430, the overall method sends the converted data to the reader device.

At step 435, the overall method optionally converts the hi-res type to a rich media enhanced hi-res type.

Figure 5:
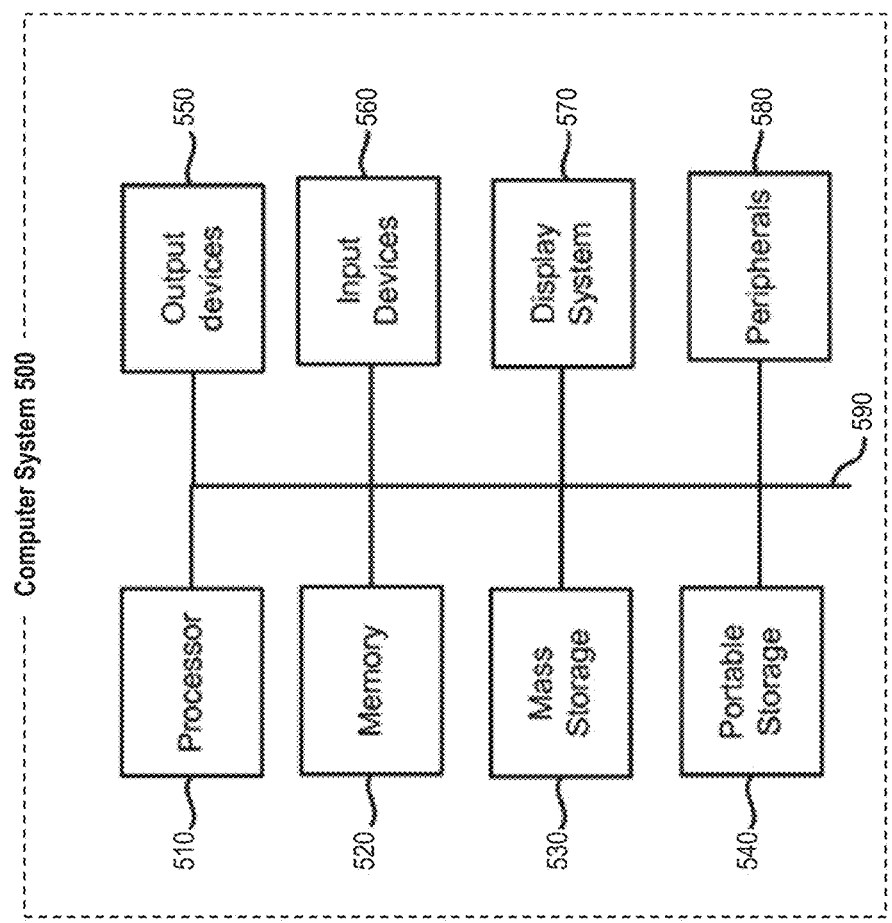
FIG. 5 is a block diagram of an exemplary computing device that may be used to implement an embodiment of the present invention.

FIG. 5 illustrates an exemplary computing system 500 that may be used to implement an embodiment of the present invention. The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, tablet computing device, video game console, e-book reader, media player device, vehicle-based computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

In some cases, the computer system 500 may be part of a multi-computer system that uses multiple computer systems 500, each for one or more specific tasks or purposes. For example, the multi-computer system may include multiple computer systems 500 communicatively coupled together via at least one of a personal area network (PAN), a local area network (LAN), a wireless local area network (WLAN), a municipal area network (MAN), a wide area network (WAN), or some combination thereof. The multi-computer system may further include multiple computer systems 500 from different networks communicatively coupled together via the internet (also known as a "distributed" system).

While various flow diagrams provided and described above may show a particular order of operations performed by certain embodiments of the invention, it should be understood that such order is exemplary. Alternative embodiments may perform the operations in a different order, combine certain operations, overlap certain operations, or some combination thereof.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for electronic book data customization, the method comprising:
   receiving, at a server, an electronic book request that requests a first electronic book, wherein the electronic book request is associated with a first user account;
   retrieving, at the server and in response to receipt of the electronic book request, a reader device identifier identifying a reader device previously associated with the first user account;
   retrieving, by the server, a device specification dataset by querying a look-up table using the reader device identifier, wherein the device specification dataset identifies a characteristic of a graphics processing unit (GPU) of the reader device that prevents the reader device from properly displaying a video media type and identifies a display size of the reader device;
   retrieving, by the server and in response to receipt of the electronic book request, an original electronic book dataset from a remote electronic book repository, wherein the original electronic book dataset is a representation of at least a specified page of the first electronic book;
   identifying that the original electronic book dataset includes a video of the video media type that is embedded within the specified page of the original electronic book dataset;
   obtaining one or more still frames from the video;
   reformatting, by the server, the original electronic book dataset by resampling text within the original electronic book dataset into a vector font and reformatting the specified page with the obtained one or more still frames in place of the video;
   obtaining, by the server, a display driver from a display look-up table using information from the device specification dataset;
   converting the reformatted original electronic book dataset into a modified electronic book dataset at the server by looking up the identified display size of the reader device from the device specification dataset and using the obtained display driver to convert a size of the reformatted original electronic book dataset to the identified display size; and
   transmitting the modified electronic book dataset from the server to the reader device in response to receipt of the electronic book request.

2. The method of claim 1, wherein reformatting the original electronic book dataset further comprises replacing a three-dimensional model within the original electronic book dataset with at least one two-dimensional image of the three-dimensional model from at least one viewing angle.

3. The method of claim 1, wherein reformatting the original electronic book dataset further comprises replacing an interactive map within the original electronic book dataset with at least one two-dimensional image of at least a subset of the interactive map.

4. The method of claim 1, wherein reformatting the original electronic book dataset comprises resampling a string of text within the original electronic book dataset into a higher-resolution font.

5. The method of claim 1, further comprising transmitting a second electronic book dataset from the server to the reader device after transmitting the modified electronic book dataset from the server to the reader device, wherein the modified electronic book dataset and the second electronic book dataset are both parts of a part-by-part stream of the first electronic book from the server to the reader device.

6. The method of claim 1, wherein the electronic book request is received via a proxy device that is connected to a network connection, and wherein transmitting the modified electronic book dataset to the reader device includes transmitting the modified electronic book dataset via the proxy device that is connected to the network connection.

7. The method of claim 1, wherein the device specification dataset also identifies a characteristic of a display screen of the reader device that prevents the reader device from properly displaying the video media type, wherein the characteristic of the display screen is a display spectrum capability.

8. The method of claim 1, wherein the retrieved device specification dataset further indicates that an amount of memory available at the reader device prevents the reader device from properly displaying the video media type.

9. The method of claim 1, wherein the retrieved device specification dataset further indicates a lack of a touch-sensitive surface at the reader device.

10. The method of claim 1, wherein the retrieved device specification dataset further indicates a lack of a programming language interpreter application at the reader device.

11. The method of claim 1, wherein the original electronic book dataset is a representation of an entirety of the first electronic book, and wherein the modified electronic book dataset is a modified representation of the entirety of the first electronic book.

12. The method of claim 1, wherein transmitting the modified electronic book dataset to the reader device is done in a part-by-part streaming fashion.

13. The method of claim 1, wherein reformatting the original electronic book dataset further comprises:
identifying a replacement image that corresponds to a first image within the original electronic book dataset, wherein at least part of the replacement image is displayable at a higher resolution than the first image; and
replacing the first image within the original electronic book dataset with the replacement image, wherein the modified electronic book dataset presents the replacement image in place of the first image.

14. A system for electronic book data customization, the system comprising:
a communication transceiver that receives, over a network, an electronic book request requesting a first electronic book, wherein the electronic book request is associated with a first user account;
a memory that stores instructions; and
a processor, wherein execution of the instructions by the processor causes the system to:
retrieve, in response to receipt of the electronic book request, a reader device identifier identifying a reader device previously associated with the first user account,
retrieve a device specification dataset by querying a look-up table using the reader device identifier, the device specification dataset identifying a characteristic of a graphics processing unit (GPU) of the reader device that prevents the reader device from properly displaying a video media type and identifies a display size of the reader device,
retrieve an original electronic book dataset from a remote electronic book repository in response to the electronic book request, wherein the original electronic book dataset is a representation of at least a specified page of the first electronic book,
identify that the original electronic book dataset includes a video of the video media type that is embedded within the specified page of the original electronic book dataset,
obtain one or more still frames from the video,
reformat the original electronic book dataset by resampling text within the original electronic book dataset into a vector font and reformatting the specified page with the obtained one or more still frames in place of the video,
obtain a display driver from a display look-up table using information from the device specification dataset,
convert the reformatted original electronic book dataset into a modified electronic book dataset by looking up the identified display size of the reader device from the device specification dataset and using the obtained display driver to convert a size of the reformatted original electronic book dataset to the identified display size, and
transmit the modified electronic book dataset to the reader device via the communication transceiver in response to receipt of the electronic book request.

15. The system of claim 14, wherein the reader device is in communicative contact with the communication transceiver through a network connection over the Internet.

16. A non-transitory computer-readable storage medium, having embodied thereon a program executable by a processor to perform a method for electronic book data customization, the method comprising:
receiving, at a server, an electronic book request that requests a first electronic book, wherein the electronic book request is associated with a first user account,
retrieving, at the server and in response to receipt of the electronic book request, a reader device identifier identifying a reader device previously associated with the first user account;
retrieving, by the server, a device specification dataset by querying a look-up table using the reader device identifier, wherein the device specification dataset identifies a characteristic of a graphics processing unit (GPU) of the reader device that prevents the reader device from properly displaying a video media type and identifies a display size of the reader device;
retrieving, by the server, an original electronic book dataset from a remote electronic book repository in response to the electronic book request, wherein the original electronic book dataset is a representation of at least a specified page of the first electronic book;
identifying that the original electronic book dataset includes a video of the video media type that is embedded within the specified page of the original electronic book dataset;
obtaining one or more still frames from the video;
reformatting, by the server, the original electronic book dataset by resampling text within the original electronic book dataset into a vector font and reformatting the specified page with the obtained one or more still frames in place of the video;
obtaining, by the server, a display driver from a display look-up table using information from the device specification dataset;
converting the reformatted original electronic book dataset into a modified electronic book dataset at the server by looking up the identified display size of the reader device from the device specification dataset and using the obtained display driver to convert a size of the reformatted original electronic book dataset to the identified display size; and transmitting the modified electronic book dataset from the server to the reader device in response to receipt of the electronic book request.

\* \* \* \* \*